United States Patent
Kohli

(10) Patent No.: US 10,410,215 B2
(45) Date of Patent: Sep. 10, 2019

(54) SYSTEM AND METHOD FOR TRANSACTION SCORING USING DELIVERY RECEIPT HISTORY

(71) Applicant: MasterCard International Incorporated, Purchase, NY (US)

(72) Inventor: Manoneet Kohli, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 719 days.

(21) Appl. No.: 15/150,861

(22) Filed: May 10, 2016

(65) Prior Publication Data

US 2017/0330190 A1  Nov. 16, 2017

(51) Int. Cl.
  *G06Q 20/40* (2012.01)
  *G06Q 20/34* (2012.01)
  *G06Q 20/30* (2012.01)

(52) U.S. Cl.
  CPC ......... *G06Q 20/4014* (2013.01); *G06Q 20/30* (2013.01); *G06Q 20/34* (2013.01); *G06Q 20/40* (2013.01)

(58) Field of Classification Search
  CPC .... G06Q 20/4014; G06Q 20/30; G06Q 20/34; G06Q 20/40
  See application file for complete search history.

(56) References Cited

U.S. PATENT DOCUMENTS

| | | | |
|---|---|---|---|
| 9,292,867 B2 | 3/2016 | Patel et al. | |
| 2007/0138257 A1 | 6/2007 | Dragt | |
| 2010/0100434 A1 | 4/2010 | Sock | |
| 2012/0209970 A1 | 8/2012 | Scipioni | |
| 2013/0151344 A1 | 6/2013 | Tavares et al. | |
| 2013/0211936 A1 | 8/2013 | Sulaiman et al. | |
| 2013/0297416 A1 | 11/2013 | Dipaola et al. | |
| 2015/0120559 A1 | 4/2015 | Fisher | |
| 2015/0187021 A1* | 7/2015 | Moring | G06Q 40/12 705/17 |
| 2016/0078436 A1 | 3/2016 | Tomasofsky | |

OTHER PUBLICATIONS

Raimund, Moser, "International Search Report", International Application No. PCT/US2017/030976, dated Jun. 29, 2017, 6 pages.
Raimund, Moser, "Written Opinion", International Application No. PCT/US2017/030976, dated Jun. 29, 2017, 6 pages.

* cited by examiner

Primary Examiner — Seung H Lee

(57) ABSTRACT

Embodiments of the disclosure enable one or more financial transactions to be processed based on a transaction score generated based at least in part on a delivery receipt history. A financial transaction processing computing device receives a request for authorization for a present financial transaction associated with a cardholder account, identifies a reference delivery receipt corresponding to a prior financial transaction associated with the cardholder account, analyzes the reference delivery receipt to generate a confidence metric indicative of a confidence in a legitimacy of the prior financial transaction, and generates a transaction score for the present financial transaction that is indicative of an expected risk associated with approving the request for authorization. Aspects of the disclosure provide for authorizing one or more financial transactions based on an authentication of a recipient associated with a prior financial transaction.

20 Claims, 8 Drawing Sheets

SYSTEM AND METHOD FOR TRANSACTION SCORING USING DELIVERY RECEIPT HISTORY

FIELD OF THE DISCLOSURE

The subject matter described herein relates generally to information processing and, more specifically, to using a delivery receipt history to generate a transaction score for determining whether to approve a request for authorization for a financial transaction.

BACKGROUND

Financial transaction cards have made great gains as a means to attract financial accounts to financial institutions and, in the case of credit cards, as a medium to create small loans and generate interest income for financial institutions. Fraudulent financial transactions involving credit cards and other similar payment mechanisms may result in huge losses for cardholders, merchants, banks, and other financial institutions. To address at least this issue, financial institutions have implemented various security mechanisms, including prompting cardholders to provide authentication for each financial transaction. However, incorporating additional steps to the financial transaction may be tedious, burdensome, and/or time-consuming and could cause cardholders to become increasingly inconvenienced, annoyed, and/or frustrated with each prompt to provide authentication.

SUMMARY

Embodiments of the disclosure enable a computing device to process one or more financial transactions. The computing device includes a memory device storing data associated with one or more cardholder accounts, one or more delivery receipts, and computer-executable instructions, and a processor configured to execute the computer-executable instructions to receive a request for authorization for a present financial transaction associated with a cardholder account, identify a reference delivery receipt corresponding to a prior financial transaction associated with the cardholder account, analyze the reference delivery receipt to generate a confidence metric indicative of a confidence in a legitimacy of the prior financial transaction, and generate a transaction score for the present financial transaction that is indicative of an expected risk associated with approving the request for authorization.

In another aspect, a computer-implemented method is provided for processing one or more financial transactions. The computer-implemented method includes receiving, from a client device, a request for authorization for a financial transaction associated with a cardholder account, identifying a delivery receipt associated with a reference financial transaction, analyzing the delivery receipt to identify transaction data associated with the reference financial transaction, generating a confidence metric indicative of a confidence in a legitimacy of the reference financial transaction, and generating a transaction score indicative of an expected risk associated with approving the request for authorization.

In yet another aspect, a computer-readable storage device having computer-executable instructions embodied thereon is provided. The computer-readable storage device includes an interface component, an extraction component, a metric component, and a score component. Upon execution by at least one processor, the interface component causes a computing device to receive a request for authorization for a financial transaction associated with a cardholder account, the extraction component causes the computing device to identify a delivery receipt associated with a prior financial transaction based on the cardholder account and identify transaction data associated with the prior financial transaction, the metric component causes the computing device to generate a confidence metric indicative of a confidence in a legitimacy of the prior financial transaction, and the score component causes the computing device to generate a transaction score indicative of an expected risk associated with approving the request for authorization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
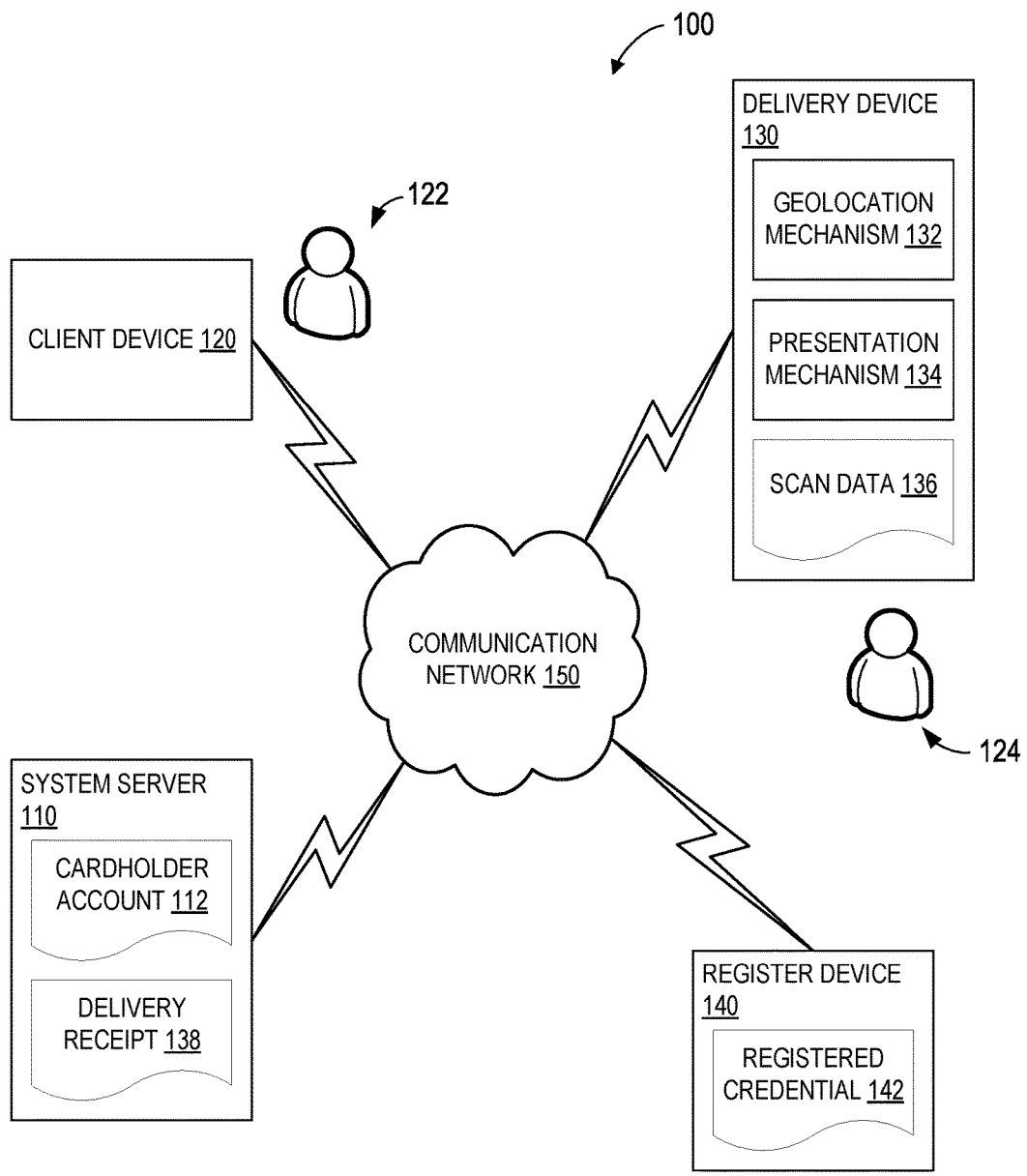
FIG. 1 is a block diagram illustrating an example system for processing one or more financial transactions.

The subject matter described herein relates to systems and methods for processing one or more financial transactions. Embodiments of the disclosure provide the ability to authenticate an identity of a recipient of a financial transaction for authorizing one or more subsequent financial transactions. That is, in some embodiments, a present financial transaction may be authorized based at least in part on a prior user action (e.g., a prior financial transaction). The embodiments described herein are configured to use transaction data associated with a prior financial transaction to determine a likelihood of a cardholder entering into a present financial transaction (e.g., an expected risk associated with approving a request for authorization for the present financial transaction) and determine whether to authorize the present financial transaction based on the determined likelihood.

Aspects of the disclosure provide for a computing device that processes one or more financial transactions in an environment including a plurality of devices coupled to each other via a network (e.g., a local area network (LAN), a wide area network (WAN), the Internet). For example, a financial transaction processing computing device may be used to communicate with one or more other computing systems (e.g., a client device, a delivery device, a register device) to receive or retrieve a request for authorization, a delivery receipt, and/or other financial transaction-related data to facilitate processing the one or more financial transactions. In this manner, a present financial transaction may be automatically authorized with at least some confidence and/or without prompting a cardholder for authentication.

The systems and processes described herein may be implemented using computer programming or engineering techniques including computer software, firmware, hardware or a combination or subset thereof. At least one technical problem with known systems is that, with the volume of financial transactions and the diversity of preferences between cardholders, it can be difficult, time-consuming, and/or resource-intensive to determine whether a financial transaction is legitimate or illegitimate. At least some known systems may decline a financial transaction if the cardholder does not provide authentication with each financial transaction lest the financial transaction be illegitimate or fraudulent. The embodiments described herein address at least these technical problems. By processing financial transactions in the manner described in this disclosure, some embodiments improve user experience, user efficiency, and/or user interaction performance by using transaction data associated with a prior financial transaction to calculate risk associated with approving a request for authorization for a present financial transaction and potentially reduce a quantity of requests to provide authentication. In this manner, the embodiments described herein may facilitate achieving a balance between convenience to the cardholder and security from fraud. Additionally, some embodiments may reduce processor load by reducing an amount of data to be analyzed or processed, reduce network bandwidth usage and/or improve communication between systems by reducing an amount of data to be transmitted, improve processor security and/or data transmission security by using biometric data to process financial transactions, and/or reduce error rate by automating the analysis and processing of financial transactions. In some embodiments, the subject matter described herein may facilitate increasing processor speed and/or improving operating system resource allocation.

The technical effect of the systems and processes described herein is achieved by performing at least one of the following operations: a) receiving a request for authorization for a financial transaction; b) identifying first transaction data (e.g., cardholder account, delivery address, delivery zone) associated with the financial transaction; c) identifying a plurality of delivery receipts and/or a plurality of prior financial transactions; d) transmitting a request for information including biometric data; e) receiving a response to the request for information including user identifier data associated with the biometric data; f) identifying second transaction data (e.g., transaction type, delivery address, delivery zone, authentication type, recipient identifier data, biometric data) associated with a prior financial transaction; g) determining whether to identify a delivery receipt as a reference delivery receipt and/or a prior financial transaction as a reference financial transaction; h) identifying a reference delivery receipt and/or a reference financial transaction; i) comparing first transaction data associated with the financial transaction with second transaction data associated with a prior financial transaction; j) generating a similarity metric indicative of a similarity between the financial transaction and the prior financial transaction; k) comparing user identifier data associated with a prior financial transaction with user identifier data associated with the cardholder account; l) generating a confidence metric associated with the prior financial transaction; m) generating a transaction score associated with the financial transaction; n) determining whether the transaction score satisfies a predetermined threshold; and/or o) approving the request for reconsideration.

FIG. 1 is a block diagram illustrating an example system 100 for processing one or more financial transactions. In some embodiments, the system 100 includes a financial transaction processing computing device or system server 110 that includes, stores, or has access to one or more cardholder accounts 112. The system server 110 is configured to process one or more financial transactions associated with one or more cardholder accounts 112, and determine whether to authorize the one or more financial transactions. For example, the system server 110 may receive a request for authorization for a financial transaction, generate a response to the request for authorization (e.g., determine whether to approve the request for authorization and/or to authorize the financial transaction), and transmit the response to the request for authorization. The system server 110 may be a single computing device or a plurality of interconnected computing devices that operate together to perform a particular function. That is, the system server 110 may be contained within a single hardware unit or be distributed among several or many different hardware units, including in the "cloud."

The system 100 includes one or more client devices 120 that facilitate a payment transfer portion of the financial transaction. For example, the client device 120 may allow one or more users or cardholders 122 to utilize one or more cardholder accounts 112 to enter into one or more financial transactions. The client device 120 may be any computing device configured to communicate with the system server 110 including, without limitation, a mobile device, a portable media player, a phablet, a tablet, a netbook, a laptop, a desktop computer, and the like. In some embodiments, the client device 120 generates a request for authorization for a financial transaction associated with the cardholder account 112, and transmits the request for authorization to the system server 110 for processing. The request for authorization may include transaction data associated with the financial transaction, such as cardholder account data (e.g., a cardholder account identifier, an expiration date, a security code), delivery data (e.g., a shipping or delivery address), and a transaction amount. Cardholder account data may include any data that identifies a cardholder account 112 and/or a characteristic or feature of the cardholder account 112, and enables a cardholder 122 to utilize the cardholder account 112 for a payment transfer portion of a financial transaction. Delivery data may include any data that defines or identifies a parameter for a product transfer portion of a financial transaction, and enables a good or service (individually or collectively a "product") associated with the financial transaction to be provided or delivered to a recipient 124. The recipient 124 may be any person or article that receives the product, including the cardholder 122.

The cardholder 122 may utilize the client device 120 to enter into a financial transaction in an electronic commerce (e-commerce) environment or other environment in which the payment transfer portion is remote from the product transfer portion with respect to time and/or space. For example, a product may be delivered at a time and/or location other than a time and location at which a request for authorization is generated. In some embodiments, the system 100 includes one or more delivery devices 130 that facilitate the product transfer portion of the financial transaction. For example, the delivery device 130 may allow the product to be delivered to the recipient 124 in accordance with delivery data. In some embodiments, the delivery device 130 includes a geolocation mechanism 132 configured to generate delivery data (e.g., temporal data, location data, geolocation data) based on a time and/or a geolocation of the delivery device 130, and/or a presentation mechanism 134 configured to present delivery data (e.g., delivery address, current location, navigation directions) to a user (e.g., delivery person). The geolocation mechanism 132 may include or be associated with, for example, global navigation satellite system (GNSS) or global positioning system (GPS) technology. The delivery device 130 may be any computing device configured to communicate with the system server 110 including, the client device 120 used to enter into the financial transaction.

In some embodiments, the delivery device 130 allows confirmation of delivery to be provided. For example, the delivery device 130 may receive user input from the recipient 124 (e.g., via the presentation mechanism 134), generate data corresponding to the detected user input, and transmit the data to the system server 110 for confirming delivery. User input may include, for example, a signature. In some embodiments, the user input includes a characteristic or feature (e.g., biometric feature) of the recipient 124 that may be used to identify or determine an identity of the recipient 124. For example, the delivery device 130 may identify a trigger (e.g., a current location corresponding to the delivery address), scan an area to locate or identify a target (e.g., the recipient 124), detect a characteristic or feature of the target (e.g. user input), and/or generate scan data 136 (e.g., first biometric data) corresponding to the detected feature. Additionally or alternatively, the recipient 124 may be prompted to provide the user input. Scan data 136 may include or be associated with, for example, a photograph, a fingerprint, an iris scan, a retinal scan, a voice print, an ear scan, a deoxyribonucleic acid (DNA) profile, or any other feature that may be used to determine an identity of a user.

In some embodiments, the scan data 136 is received from an article (e.g., a contactless payment card, a semiconductor chip, a computing device) configured to provide scan data 136. To facilitate increasing a security of data transmitted between the article and the server system 110 and/or delivery device 130, the article may be identified as being authorized to communicate with the system server 110 and/or delivery device 130 regarding the financial transaction and/or cardholder account 112. For example, the delivery device 130 may identify a trigger (e.g., detection of the article), and transmit data associated with the trigger (e.g., article identifier data) to the system server 110 for authorizing the article. If the article is authorized, the delivery device 130 receives an instruction to communicate with the article to obtain the scan data 136. Alternatively, the system server 110 may use the article identifier data to communicate directly with the article for obtaining the scan data 136. The delivery device 130 may communicate with the article using contactless technology, such as contactless smart card technology, radio frequency identification (RFID) technology, a BLUETOOTH® brand wireless technology, a ZIGBEE® brand communication technology, a WI-FI® brand local area wireless computing network technology, or a near field communication (NFC) wireless communication technology. (BLUETOOTH® is a registered trademark of Bluetooth Special Interest Group, ZIGBEE® is a registered trademark of the ZigBee Alliance, and WI-FI® is a registered trademark of the Wi-Fi Alliance).

A delivery receipt 138 associated with the financial transaction may be generated to record a status of the financial transaction. In some embodiments, the system server 110 communicates with the delivery device 130 to generate the delivery receipt 138. Alternatively, at least a portion of the delivery receipt 138 may be generated at the delivery device 130 and transmitted to the system server 110. The delivery receipt 138 may include data associated with the payment transfer portion (e.g., data associated with the request for authorization) and/or data associated with the product transfer portion (e.g., data associated with the delivery of the product) of the financial transaction. For example, the delivery receipt 138 may include user identifier data (e.g., scan data 136), cardholder account data (e.g., cardholder account identifier), and/or delivery data (e.g., delivery address, delivery time, delivery date, delivery day, geolocation data). User identifier data may include any data that identifies a user including, for example, a name, a username, a government-issued identifier, or any other data that may be used to identify the cardholder 122.

The system 100 may include a register device 140 that includes, stores, or has access to registered data (e.g., user identifier data, biometric data, demographic data) that may be used to authenticate or confirm an identity of a user (e.g., the recipient 124). The register device 140 is associated with an entity that accumulates or collects one or more registered credentials 142 (e.g., second biometric data) from a plurality of users. In some embodiments, the registered credentials 142 are collected by an entity other than an entity associated with the system server 110, and the register device 140 is remote or distinct from the system server 110. Alternatively, at least some of the registered credentials 142 may be collected by an entity associated with the system server 110, and/or the register device 140 may be integrated or included in the system server 110. For example, scan data 136 confirmed to be associated with a user may be registered at the register device 140 as a registered credential 142.

The register device 140 may be used to determine whether a recipient 124 is authorized to receive a product associated with the financial transaction. For example, the register device 140 may receive a request for information including scan data 136 associated with the recipient 124 from the delivery device 130 (e.g., via the system server 110), identify recipient identifier data (e.g., user identifier data associated with the recipient 124) associated with the scan data 136, generate a response to the request for information including the recipient identifier data, and/or transmit the response to the request for information to the system server 110 for confirming an identity of the recipient 124 based on the recipient identifier data. The recipient identifier data may be identified, for example, based on a comparison of the scan data 136 with one or more registered credentials 142.

In some embodiments, the system server 110 compares the recipient identifier data with user identifier data associated with the cardholder account 112 to determine whether the recipient identifier data corresponds to user identifier data associated with the cardholder account 112. If the recipient identifier data corresponds to user identifier data associated with a cardholder 122 or with an authorized recipient 124, the recipient 124 may be identified as being authorized to receive the product associated with the financial transaction. If the scan data 136 may not be used to determine whether the recipient 124 is authorized to receive the product (e.g., the scan data 136 does not correspond to a registered credential 142, the recipient identifier data does not correspond to user identifier data associated with the cardholder account 112), other data (e.g., user identifier data, cardholder account data) may be used to determine whether the recipient 124 is authorized to receive the product. For example, the recipient 124 may present a government-issued identification including user identifier data and/or provide a personal identification number (PIN) or password associated with the cardholder account 112 for confirming an identity of the recipient 124.

The system 100 includes one or more communication networks 150 that enable data to be transferred between a plurality of computing devices (e.g., system server 110, client device 120, delivery device 130, and register device 140) coupled to the communication network 150. Example communication networks 150 include a cellular or mobile network and the Internet. Alternatively, the communication network 150 may be any communication medium that enables the system 100 to function as described herein including, for example, a personal area network (PAN), a LAN, and/or a WAN.

Figure 2:
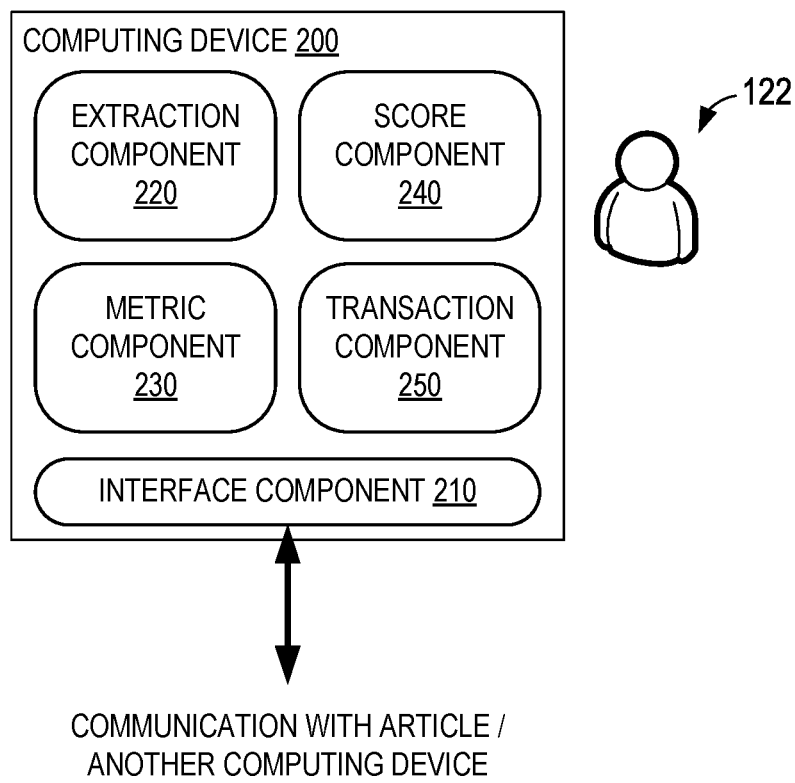
FIG. 2 is a block diagram illustrating an example computing device including a plurality of components that may be used to process one or more financial transactions.

FIG. 2 is a block diagram illustrating an example computing device 200 (e.g., system server 110) for processing a present financial transaction based at least in part on a delivery receipt history. For example, the computing device 200 may analyze a reference delivery receipt (e.g., delivery receipt 138) associated with a prior or reference financial transaction to determine whether to approve a request for authorization for the present financial transaction. To enable the computing device 200 to process the present financial transaction based at least in part on the delivery receipt history, the computing device 200 may include, for example, an interface component 210, an extraction component 220, a metric component 230, a score component 240, and/or a transaction component 250.

The interface component 210 enables the computing device 200 to communicate with an article, such as a client device 120 (shown in FIG. 1), a delivery device 130 (shown in FIG. 1), and/or a register device 140 (shown in FIG. 1). For example, the interface component 210 may be configured to receive a request for authorization for a present financial transaction associated with a cardholder account 112 (e.g., from a client device 120), transmit a response to the request for authorization (e.g., to the client device 120), transmit delivery data (e.g., to a delivery device 130), receive a request for authentication including scan data 136 (e.g., from the delivery device 130), transmit a request for information including the scan data 136 (e.g., to a register device 140), receive a response to the request for information including user identifier data associated with the scan data 136 (e.g., from the register device 140), and/or transmit a response to the request for authentication (e.g., to the delivery device 130). In some embodiments, the interface component 210 is coupled to a communication network 150 (shown in FIG. 1) to facilitate communication between the computing device 200 and the article (e.g., another computing device) via the communication network 150. The interface component 210 may be coupled to and/or communicate with the extraction component 220, the metric component 230, the score component 240, and/or the transaction component 250 to facilitate communication between the interface component 210, the extraction component 220, the metric component 230, the score component 240, and/or the transaction component 250.

The extraction component 220 enables the computing device 200 to extract or identify data that may be used to process one or more financial transactions. For example, the extraction component 220 may be configured to obtain a request for authorization (e.g., via the interface component 210), and analyze the request for authorization to identify first transaction data (e.g., user identifier data, cardholder account data, delivery data, product data, merchant data) associated with the present financial transaction. Additionally, the extraction component 220 may be configured to identify a cardholder account 112 associated with the request for authorization, identify a reference delivery receipt 138 associated with the cardholder account 112, and analyze the reference delivery receipt 138 to identify second transaction data (e.g., user identifier data, cardholder account data, delivery data, product data, merchant data) associated with a prior financial transaction.

The metric component 230 and the score component 240 enable the computing device 200 to process data associated with one or more financial transactions to have at least some confidence in authorizing a present financial transaction. For example, the metric component 230 may be configured to obtain transaction data (e.g., from the extraction component 220 via the interface component 210), and generate one or more confidence metrics based on the transaction data. The confidence metric may be indicative of a confidence in a legitimacy (e.g., not illegitimate or fraudulent) of a prior financial transaction. In some embodiments, the metric component 230 obtains a transaction type, delivery address, recipient identifier data, and/or authentication type associated with the prior financial transaction, and generates a confidence metric based on the transaction type, delivery address, recipient identifier data, and/or authentication type.

Additionally or alternatively, the metric component 230 may be configured to generate one or more similarity metrics based on the transaction data. The similarity metric may be indicative of a similarity between a plurality of financial transactions. In some embodiments, the metric component 230 obtains first transaction data associated with the present financial transaction, obtains second transaction data associated with the prior transaction, and compares the first transaction data with the second transaction data to generate a similarity metric based on the comparison of the first transaction data with the second transaction data.

The score component 240 may be configured to obtain transaction data (e.g., from the extraction component 220 via the interface component 210), obtain one or more confidence metrics and/or similarity metrics (e.g., from the metric component 230 via the interface component 210), and generate one or more transaction scores based on the transaction data, confidence metrics, similarity metrics, and/or one or more parameters. The transaction score may be indicative of a consistency of the present financial transaction with respect to an expected user behavior based on a prior user action (e.g., a prior financial transaction). In this manner, the transaction score may be indicative of an expected risk associated with approving the request for authorization and/or authorizing the present financial transaction. A lower score (e.g., 1) may be associated with a user action that is more consistent with the expected user behavior or a lesser amount of risk, and a higher score (e.g., 10) may be associated with a user action that is less consistent with the expected user behavior or a greater amount of risk (e.g., on a ten-point scale).

In some embodiments, the score component 240 defines or identifies one or more parameters for generating the transaction score based on one or more demographic-based factors associated with a population of similar users, one or more cardholder account-based factors associated with prior user actions of the cardholder 122, and/or one or more financial transaction-based factors associated with a prior user action of the cardholder 122. For example, the one or more parameters may be determined based on demographic data (e.g., race, ethnicity, age, sex, gender, ethnicity, disability, height, weight, annual income, employment status, net worth, home ownership status, home size, household size, recurring debt, debt-to-income ratio, credit score, religion, political party, employment status, occupation, education level, languages spoken, military or veteran status, geographical location), cardholder account data (e.g., transaction history, delivery receipt history), and/or delivery data (e.g., delivery address, delivery time, delivery date, delivery day).

The transaction component 250 enables the computing device 200 to process one or more financial transactions. For example, the transaction component 250 may be configured to obtain the transaction score associated with the present financial transaction (e.g., from the score component 240 via the interface component 210), and generate a response to the request for authorization based on the transaction score. In some embodiments, the transaction component 250 uses the transaction score to determine whether to approve the request for authorization without prompting the cardholder 122 for authentication. In this manner, the processing of financial transactions may be streamlined to improve cardholder experience to facilitate managing a proportion of uncompleted or abandoned financial transactions.

In some embodiments, the transaction component 250 automatically approves the request for authorization when the transaction score satisfies a predetermined threshold (e.g., the transaction score is less than or equal to the predetermined threshold), and automatically declines the request for authorization when the transaction score does not satisfy the predetermined threshold (e.g., the transaction score is greater than or equal to the predetermined threshold). Alternatively, the transaction component 250 may automatically approve the request for authorization when the transaction score is less than or equal to the predetermined threshold, and flag the request for authorization when the transaction score is greater than the predetermined threshold. In some embodiments, flagging a request for authorization results in additional analysis or attention to the financial transaction. For example, the cardholder 122 may be prompted to provide other data (e.g., user identifier data, cardholder account data) to facilitate managing risk. For another example, the transaction component 250 may automatically decline the request for authorization when the transaction score is greater than or equal to a second predetermined threshold.

Figure 3:
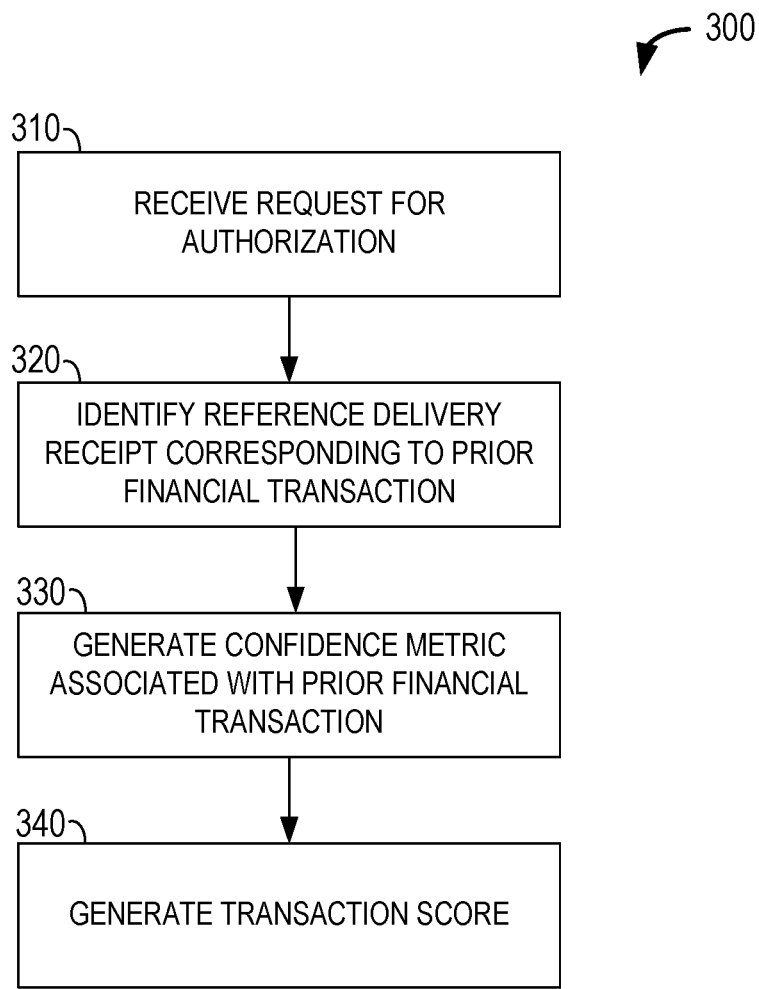
FIG. 3 is a flowchart of an example method that may be used for processing one or more financial transactions using a computing device, such as the computing device shown in FIG. 2.

FIG. 3 is a flowchart of an example method 300 for processing one or more financial transactions using a computing device 200 (shown in FIG. 2). A request for authorization for a present financial transaction is received at 310. For example, the request for authorization may be received from a client device 120. The request for authorization is associated with a cardholder account 112 and may, for example, access a credit line or an account balance to enable a cardholder 122 to enter into the financial transaction.

One or more reference delivery receipts 138 corresponding to one or more prior or reference financial transactions associated with the cardholder account 112 are identified at 320. For example, the request for authorization may be analyzed to identify the cardholder account 112, and the reference delivery receipt 138 may be identified based on the cardholder account 112. In some embodiments, a set or plurality of delivery receipts 138 corresponding to a plurality of prior financial transactions is identified based on the cardholder account 112, and the reference delivery receipt 138 is selected from the plurality of delivery receipts.

A confidence metric associated with the prior financial transaction is generated at 330. For example, the reference delivery receipt 138 may be analyzed to identify transaction data associated with the prior financial transaction, and the confidence metric may be generated based on the transaction data. Based on the confidence metric, a transaction score is generated at 340 for authorizing a financial transaction. The request for authorization may be automatically approved when the transaction score satisfies a predetermined threshold. On the other hand, the request for authorization may not be automatically approved (e.g., flagged and/or declined) when the transaction score does not satisfy the predetermined threshold.

Figure 4:
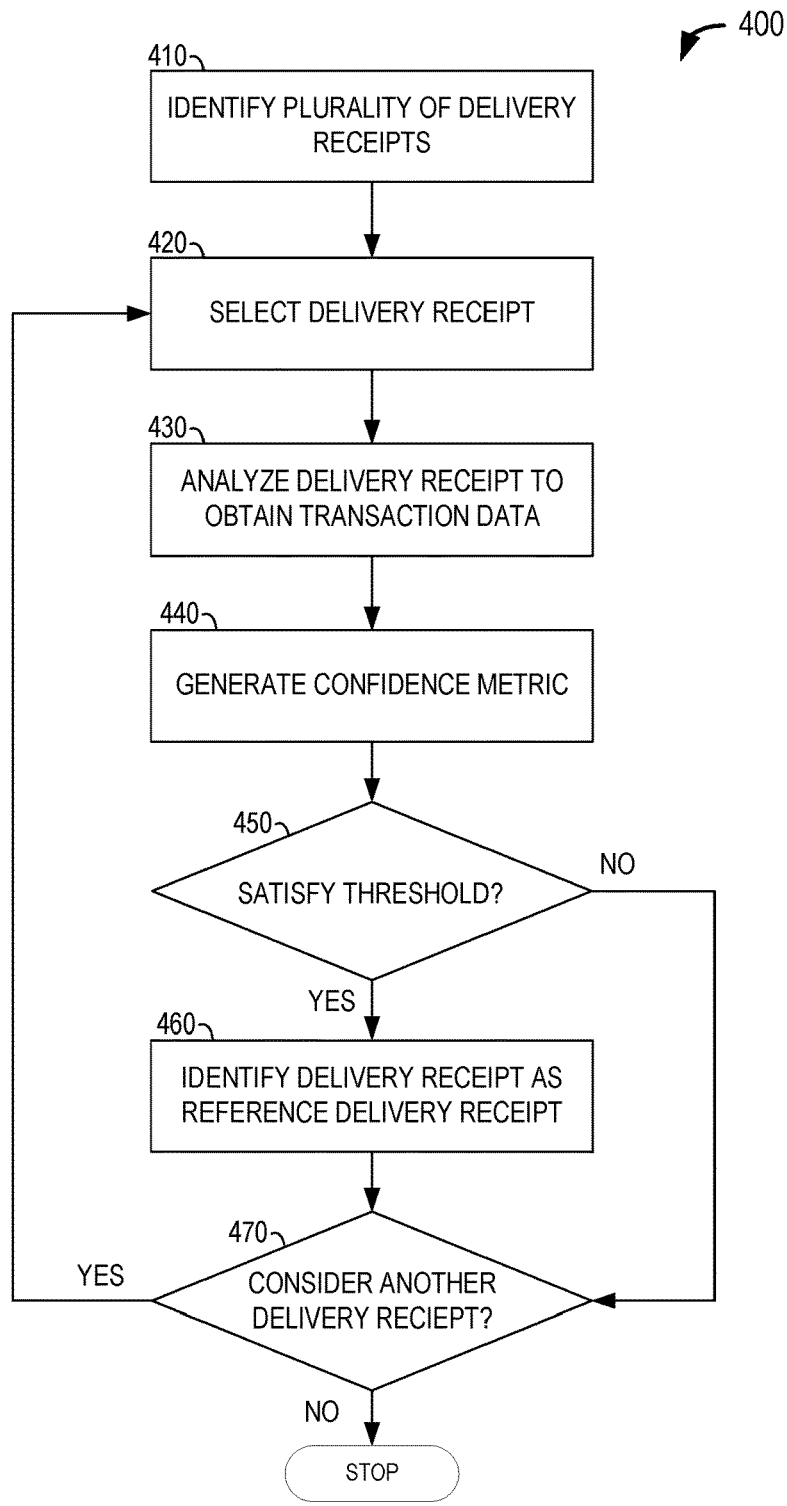
FIG. 4 is a flowchart of an example method for identifying a reference delivery receipt using a computing device, such as the computing device shown in FIG. 2.

FIG. 4 is a flowchart of an example method 400 for identifying a reference delivery receipt 138 using a computing device 200 (shown in FIG. 2). As described above with respect to identifying the reference delivery receipt 138 at 320, the reference delivery receipt 138 may be selected from a plurality of delivery receipts 138 corresponding to a plurality of prior financial transactions.

The plurality of delivery receipts 138 are identified at 410, and at least a portion of the plurality of delivery receipts 138 are analyzed to select or identify the reference delivery receipt 138 from the plurality of delivery receipts 138. For example, a first delivery receipt 138 of the plurality of delivery receipts 138 is selected at 420 and analyzed at 430 to identify transaction data associated with a first prior financial transaction (e.g., transaction type, delivery address, authentication type, and recipient identifier data).

A confidence metric associated with the first prior financial transaction is generated at 440 based on the transaction data associated with the first prior financial transaction. Additionally or alternatively, the confidence metric may be generated at least in part on a similarity metric. For example, the similarity metric may be generated based on a similarity between first transaction data associated with the present financial transaction and second transaction data associated with the prior financial transaction. In some embodiments, the confidence metric and/or similarity metric are generated based on a transaction type, a delivery address, recipient identifier data, and/or an authentication type.

For example, a transaction type corresponding to a physical or in-person presentation of a payment card may be assigned a higher amount of confidence than another transaction type corresponding to a remote financial transaction. For another example, a delivery address corresponding to a billing address or to an authorized delivery address associated with the cardholder account 112 may be assigned a higher amount of confidence than another delivery address that does not correspond to the billing address or to an authorized delivery address. Additionally or alternatively, a delivery address corresponding to a delivery zone in a lower-crime area may be assigned a higher amount of confidence than another delivery address corresponding to a delivery zone in a higher-crime area. A delivery zone is defined or identified based on neighborhood, school district, community, postal code (e.g., Zone Improvement Plan (ZIP) code), city, county, telephone area code, state, statistical area, census tract, country, and the like, and may be identified based on a location of the delivery address. For yet another example, recipient identifier data corresponding to user identifier data associated with the cardholder account 112 (e.g., the recipient identifier data corresponds to user identifier data associated with a cardholder 122 or with an authorized recipient 124) may be assigned a higher amount of confidence than another recipient identifier data that does not correspond to user identifier data associated with the cardholder account 112. On the other hand, recipient identifier data confirmed to be associated with a recipient 124 who is expressly unauthorized (e.g., the recipient 124 is on a "blacklist") may be assigned a low amount of confidence, if any. For yet another example, an authentication type corresponding to a biometric authentication of the recipient 124 (e.g., the recipient identifier data was confirmed to be associated with the recipient 124 using biometric data) may be assigned a higher amount of confidence than another authentication type corresponding to no authentication.

It is determined at 450 whether a threshold is satisfied for identifying a reference delivery receipt 138. For example, the transaction data, confidence metric, and/or similarity metric associated with the first prior financial transaction may be compared with one or more predetermined parameters and/or with other transaction data, confidence metrics, and/or similarity metrics associated with one or more other financial transactions to determine whether the threshold is satisfied. If the threshold is satisfied at 450, the delivery receipt 138 associated with the first prior financial transaction is identified as the reference delivery receipt 138 at 460 and/or the first prior financial transaction is identified as the reference financial transaction Upon identifying the reference delivery receipt 138 at 460 or determining that the threshold is not satisfied at 450, it is determined at 470 whether another delivery receipt 138 is to be considered for being identified as a reference delivery receipt 138. In some embodiments, a characteristic or attribute of one or more reference delivery receipts 138, individually or collectively, is compared with one or more predetermined parameters to determine whether another reference delivery receipt 138 is to be identified. For example, a characteristic or attribute of a set of reference delivery receipts 138 (e.g., a quantity of reference delivery receipts 138, a composite confidence metric associated with a plurality of confidence metrics, a composite similarity metric associated with a plurality of similarity metrics), and/or a characteristic or attribute associated with a particular reference delivery receipt 138 (e.g., transaction data, confidence metric, and/or similarity metric) may be compared with the one or more predetermined parameters.

If it is determined that another delivery receipt 138 is not to be considered at 470, the method 400 for identifying a reference delivery receipt 138 is complete. On other hand, if it is determined that another delivery receipt 138 is to be considered at 470, another delivery receipt 138 is selected at 420 for consideration and at least a portion of the method 400 is iteratively implemented to identify one or more reference delivery receipts 138 using the computing device 200.

Figure 5:
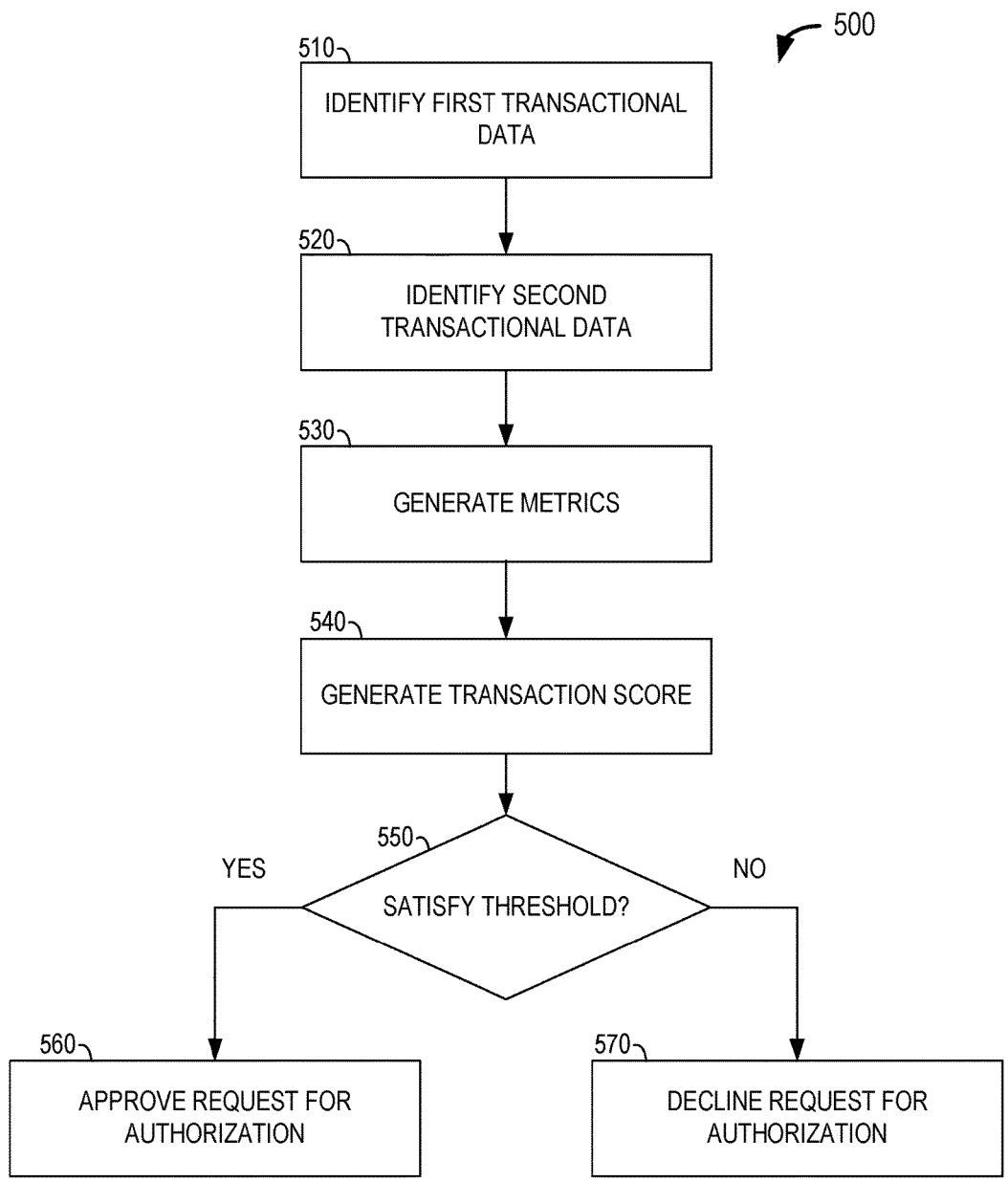
FIG. 5 is a flowchart of an example method for generating a response to a request for authorization using a computing device, such as the computing device shown in FIG. 2.

FIG. 5 is a flowchart of an example method 500 for generating a response to a request for authorization using a computing device 200 (shown in FIG. 2). At least a portion of a request for authorization associated with a present financial transaction is analyzed to obtain or identify at 510 first transaction data associated with the present financial transaction, and at least a portion of a reference delivery receipt 138 associated with a reference or prior financial transaction is analyzed to obtain or identify at 520 second transaction data associated with the reference financial transaction.

As described above with respect to generating a confidence metric at 440, a confidence metric associated with the reference financial transaction is generated at 530 based on the second transaction data associated with the reference financial transaction and/or a similarity metric associated with a similarity between the first transaction data and the second transaction data. A transaction score is generated at 540 for the present financial transaction based on the first transaction data (e.g., transaction type, delivery address). For example, a transaction type corresponding to a physical or in-person presentation of a payment card may be assigned a lesser amount of risk than another transaction type corresponding to a remote financial transaction. For another example, a delivery address corresponding to a billing address or to an authorized delivery address associated with the cardholder account 112 may be assigned a lesser amount of risk than another delivery address that does not correspond to the billing address or to an authorized delivery address. Additionally or alternatively, a delivery address corresponding to a delivery zone in a lower-crime area may be assigned a lesser amount of risk than another delivery address corresponding to a delivery zone in a higher-crime area.

In some embodiments, the transaction score is generated at 540 for the present financial transaction based on the confidence metric associated with the reference financial transaction and/or the similarity metric associated with the similarity between the first transaction data and the second transaction data. For example, a first delivery address associated with the present financial transaction may be compared with a second delivery address associated with the reference financial transaction to assign an amount of risk. In some embodiments, a first delivery address corresponding to a second delivery address (e.g., a repeated use of a delivery address) may be assigned a lesser amount of risk than a first delivery address that does not correspond to a second delivery address (e.g., a first use of a delivery address). On the other hand, a repeated use of a delivery address that is not associated with a cardholder account 112 (e.g., the delivery address is neither a billing address nor an authorized delivery address) may be assigned a greater amount of risk than a first use of a delivery address associated with the cardholder account 112 (e.g., the delivery address is a billing address or an authorized delivery address).

In some embodiments, a delivery address is identified as being an authorized delivery address upon satisfying one or more predetermined parameters. For example, a delivery address used for a predetermined quantity of financial transactions or for a predetermined amount of time without a challenge to or dispute over a financial transaction associated with the delivery address may be identified as being an authorized delivery address. For another example, a delivery address associated with a financial transaction for which recipient identifier data was confirmed to be associated with a cardholder 122 or with an authorized recipient 124 may be identified as being an authorized delivery address.

The transaction score may be used to generate a response to the request for authorization based on the transaction score. For example, it is determined at 550 whether the transaction score satisfies a predetermined threshold. The request for authorization is automatically approved at 560 when the transaction score satisfies a predetermined threshold (e.g., the transaction score is indicative of a lesser amount of risk). On the other hand, the request for authorization is not automatically approved when the transaction score does not satisfy the predetermined threshold. For example, the request for authorization may be flagged for additional analysis or attention and/or automatically declined at 570 when the transaction score does not satisfy the predetermined threshold or when the transaction score satisfies a second predetermined threshold (e.g., the transaction score is indicative of a greater amount of risk).

Figure 6:
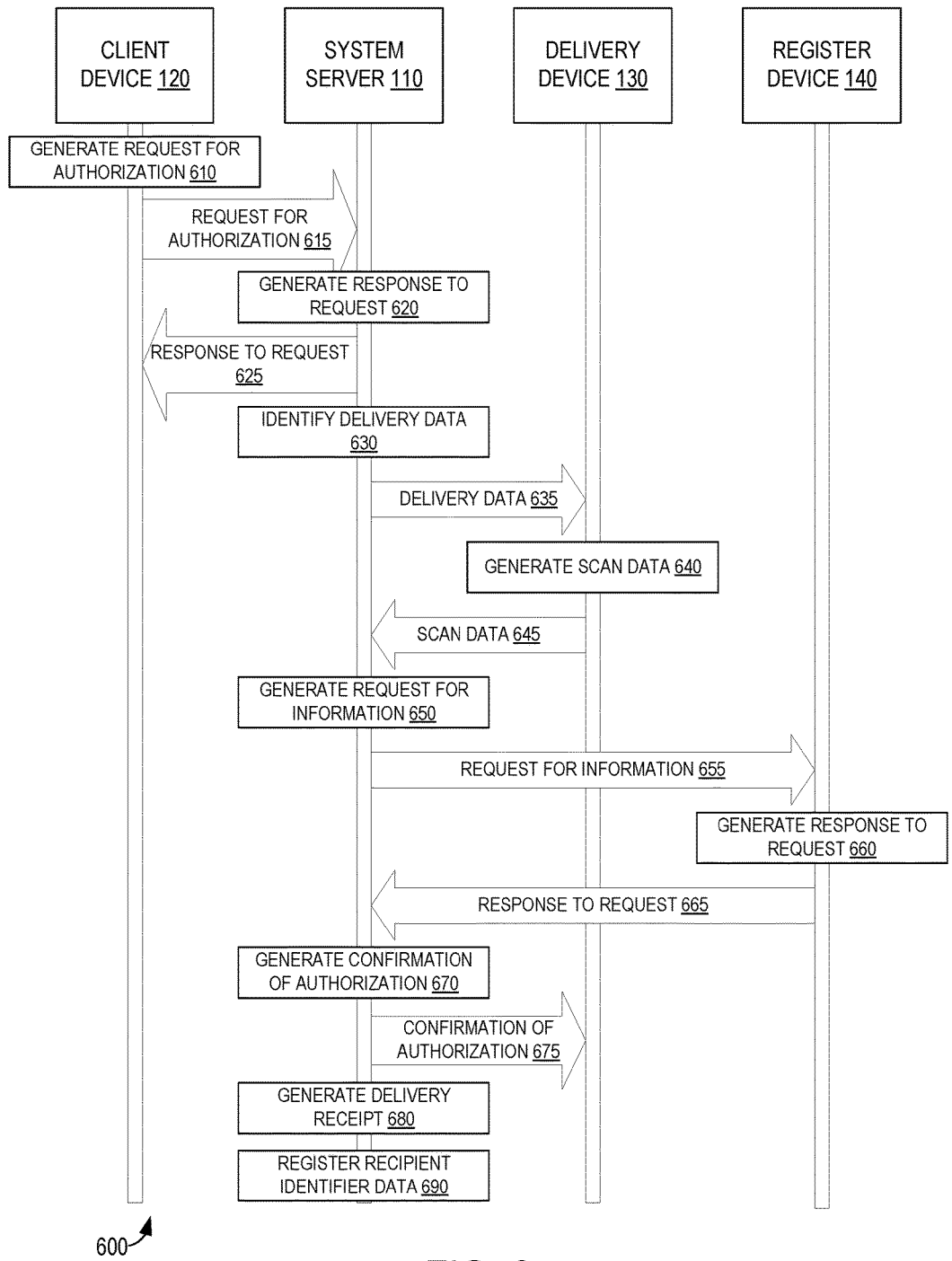
FIG. 6 is a sequence diagram for processing a financial transaction in a system, such as the system shown in FIG. 1.

FIG. 6 is a sequence diagram 600 for processing a financial transaction in a system 100 (shown in FIG. 1). In some embodiments, a client device 120 generates at 610 a request for authorization for a financial transaction associated with a cardholder account 112 at a client device 120 and transmits at 615 the request for authorization to a server system 110. In response to receiving the request for authorization, the server system 110 generates at 620 a response to the request for authorization, and transmits at 625 the response to the request for authorization to the client device 120. As described above with respect to methods 300, 400, and/or 500, the response to the request for authorization may be generated based at least in part on a prior user action (e.g., a prior financial transaction).

For authorized financial transactions in which a payment transfer portion (e.g., generation and communication of the request for authorization and the response to the request for authorization) is remote from a product transfer portion, the system server 110 identifies at 630 delivery data associated with the financial transaction, and transmits at 635 the delivery data to a delivery device 130 for use during the product transfer portion of the financial transaction. The delivery device 130 may be used to deliver a product associated with the financial transaction to a recipient 124 in accordance with the delivery data.

In some embodiments, the delivery device 130 obtains confirmation of delivery from the recipient 124. For example, the delivery device 130 may receive user input from the recipient 124, generate at 640 scan data 136 (e.g., first biometric data) corresponding to the user input, and transmit at 645 the scan data 136 to the system server 110 for providing confirmation of delivery.

For financial transactions in which an identify of the recipient 124 is to be confirmed for delivering the product in accordance with the delivery data, the system server 110 generates at 650 a request for information, and transmits at 655 the request for information including the scan data 136 to a register device 140 for confirming an identity of the recipient 124. The register device 140 identifies a registered credential 142 (e.g., second biometric data) that corresponds to the scan data 136, identifies user identifier data associated with the registered credential 142 (e.g., recipient identifier data), generates at 660 a response to the request for information including the recipient identifier data, and transmits at 665 the response to the request for information to the system server 110.

The system server 110 compares the recipient identifier data with user identifier data associated with the cardholder account 112 to determine whether the recipient 124 is authorized to receive the product associated with the financial transaction. If the recipient identifier data corresponds to user identifier data associated with the cardholder account 112, the system server 110 identifies the recipient 124 as being authorized to receive the product, generates at 670 a confirmation of authorization indicating that the recipient 124 is authorized to receive the product, transmits at 675 the confirmation of authorization to the delivery device 130, and generates at 680 a delivery receipt 138 associated with the present financial transaction to record a status of the financial transaction at the system server 110. The delivery receipt 138 may be used, for example, to facilitate determining whether to authorize a subsequent financial transaction using the cardholder account 112. In some embodiments, the system server 110 registers at 690 the recipient identifier data with the cardholder account 112 as an authorized recipient 124 for one or more financial transactions associated with the cardholder account 112.

Figure 7:
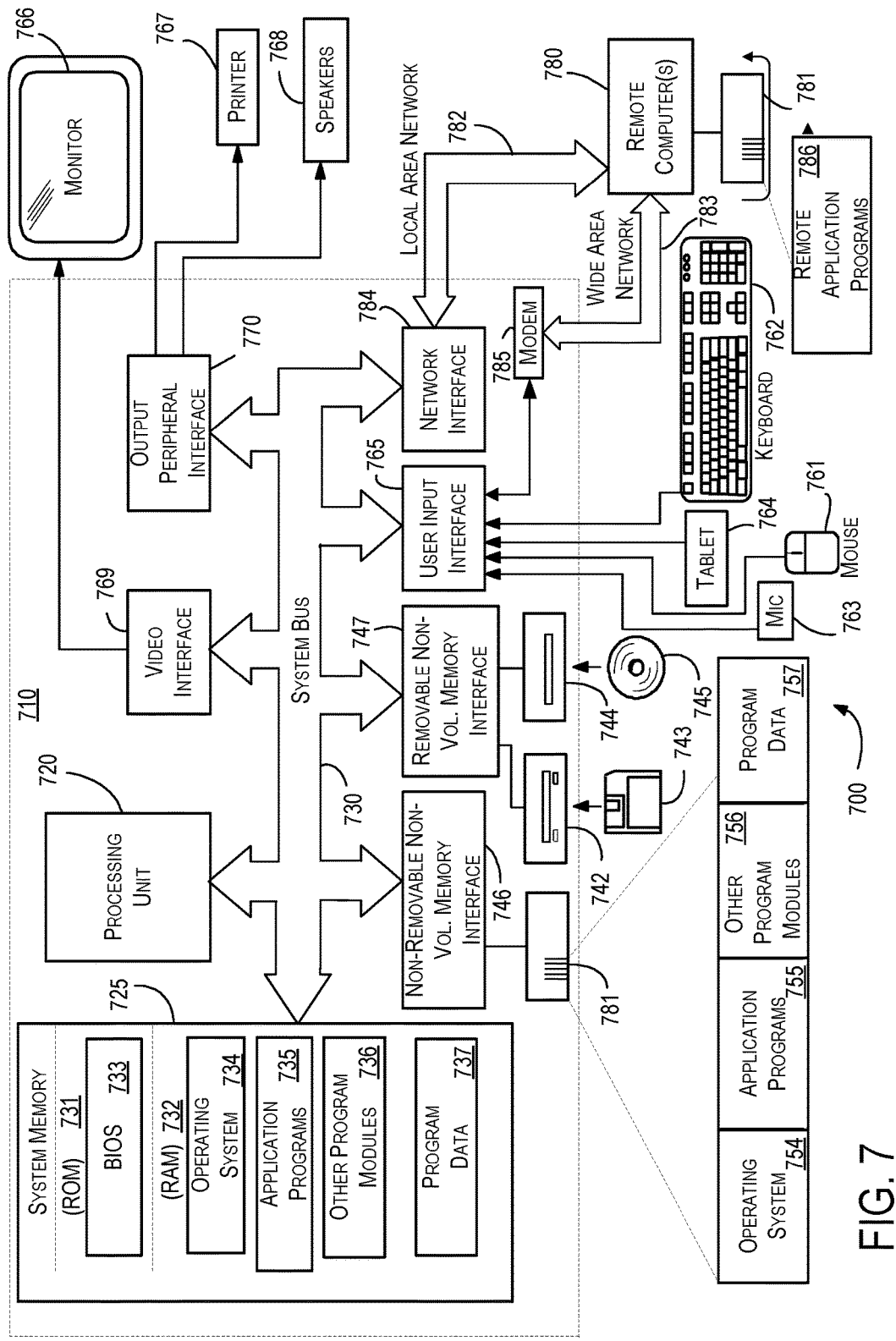
FIG. 7 is a block diagram of an example operating environment for processing one or more financial transactions.

FIG. 7 is a block diagram of an example operating environment 700 that may be used to process one or more financial transactions. The operating environment 700 is only one example of a computing and networking environment and is not intended to suggest any limitation as to the scope of use or functionality of the disclosure. The operating environment 700 should not be interpreted as having any dependency or requirement relating to any one or combination of components illustrated in the example operating environment 700.

The disclosure is operational with numerous other computing and networking environments or configurations. While some examples of the disclosure are illustrated and described herein with reference to the operating environment 700 being or including a system server 110 (shown in FIG. 1) or a computing device 200 (shown in FIG. 2), aspects of the disclosure are operable with any computing device (e.g., client device 120, delivery device 130, register device 140, interface component 210, extraction component 220, metric component 230, score component 240, transaction component 250) that executes instructions to implement the operations and functionality associated with the operating environment 700.

For example, the operating environment 700 may include a mobile device, a mobile telephone, a phablet, a tablet, a portable media player, a netbook, a laptop, a desktop computer, a personal computer, a server computer, a computing pad, a kiosk, a tabletop device, an industrial control device, a multiprocessor system, a microprocessor-based system, a set top box, programmable consumer electronics, a network computer, a minicomputer, a mainframe computer, a distributed computing environment that include any of the above systems or devices, and the like. The operating environment 700 may represent a group of processing units or other computing devices. Additionally, any computing device described herein may be configured to perform any operation described herein including one or more operations described herein as being performed by another computing device.

With reference to FIG. 7, an example system for implementing various aspects of the disclosure may include a general purpose computing device in the form of a computer 710. Components of the computer 710 may include, but are not limited to, a processing unit 720 (e.g., a processor), a system memory 725 (e.g., a computer-readable storage device), and a system bus 730 that couples various system components including the system memory 725 to the processing unit 720. The system bus 730 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 725 includes any quantity of media associated with or accessible by the processing unit 720. For example, the system memory 725 may include computer storage media in the form of volatile and/or nonvolatile memory, such as read only memory (ROM) 731 and random access memory (RAM) 732. The ROM 731 may store a basic input/output system 733 (BIOS) that facilitates transferring information between elements within computer 710, such as during start-up. The RAM 732 may contain data and/or program modules that are immediately accessible to and/or presently being operated on by processing unit 720. For example, the system memory 725 may store computer-executable instructions, communication data, authentication data, application data, and other data.

The processing unit 720 may be programmed to execute the computer-executable instructions for implementing aspects of the disclosure, such as those illustrated in the figures (e.g., FIGS. 3-6). By way of example, and not limitation, FIG. 7 illustrates operating system 734, application programs 735, other program modules 736, and program data 737. The processing unit 720 includes any quantity of processing units, and the instructions may be performed by the processing unit 720 or by multiple processors within the operating environment 700 or performed by a processor external to the operating environment 700.

The system memory 725 may include computer-executable instructions, user identifier data, biometric data, transaction data, cardholder account data, delivery data, demographic data, and other data. For example, the system memory 725 may include an interface component 210 (shown in FIG. 2), an extraction component 220 (shown in FIG. 2), a metric component 230 (shown in FIG. 2), a score component 240 (shown in FIG. 2), and/or a transaction component 250 (shown in FIG. 2) for implementing aspects of the disclosure.

Upon programming or execution of these components, the operating environment 700 and/or processing unit 720 is transformed into a special purpose microprocessor or machine. For example, the interface component 210, when executed by the processing unit 720, causes the computer 710 to receive a request for authorization for a financial transaction; the extraction component 220, when executed by the processing unit 720, causes the computer 710 to identify a set of delivery receipts 138 associated with a cardholder account 112, and select a reference delivery receipt 138 associated with a prior financial transaction from the set of delivery receipts 138; the metric component 230, when executed by the processing unit 720, causes the computer 710 to analyze the reference delivery receipt 138 to generate a confidence metric associated with the prior financial transaction, and generate a similarity metric associated with the financial transaction and the prior financial transaction; the score component 240, when executed by the processing unit 720, causes the computer 710 to generate a transaction score for the present financial transaction; and/or the transaction component 250, when executed by the processing unit 720, causes the computer 710 to determine whether the transaction score satisfies a predetermined threshold and, on condition that the predetermined threshold is satisfied, approve the request for reconsideration. Although the processing unit 720 is shown separate from the system memory 725, embodiments of the disclosure contemplate that the system memory 725 may be onboard the processing unit 720 such as in some embedded systems.

The computer 710 includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 731 and RAM 732 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 710. Computer storage media are implemented in hardware and exclude carrier waves and propagated signals. Any such computer storage media may be part of computer 710.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 710 through one or more input devices, such as a pointing device 761 (e.g., mouse, trackball, touch pad), a keyboard 762, a microphone 763, and/or an electronic digitizer 764 (e.g., tablet). Other input devices not shown in FIG. 7 may include a joystick, a game pad, a controller, a satellite dish, a camera, a scanner, an accelerometer, or the like. These and other input devices may be coupled to the processing unit 720 through a user input interface 765 that is coupled to the system bus 730, but may be connected by other interface and bus structures, such as a parallel port, game port or a universal serial bus (USB).

Information, such as text, images, audio, video, graphics, alerts, and the like, may be presented to a user via one or more presentation devices, such as a monitor 766, a printer 767, and/or a speaker 768. Other presentation devices not shown in FIG. 7 may include a projector, a vibrating component, or the like. These and other presentation devices may be coupled to the processing unit 720 through a video interface 769 (e.g., for a monitor 766 or a projector) and/or an output peripheral interface 770 (e.g., for a printer 767, a speaker 768, and/or a vibration component) that are coupled to the system bus 730, but may be connected by other interface and bus structures, such as a parallel port, game port or a USB. In some embodiments, the presentation device is integrated with an input device configured to receive information from the user (e.g., a capacitive touch-screen panel, a controller including a vibrating component). Note that the monitor 766 and/or touch screen panel may be physically coupled to a housing in which the computer 710 is incorporated, such as in a tablet-type personal computer.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 782 and one or more wide area networks (WAN) 783, but may also include other networks. Such networking environments are commonplace in offices, enterprise-wide computer networks, intranets and the Internet.

When used in a LAN networking environment, the computer 710 is coupled to the LAN 782 through a network interface or adapter 784. When used in a WAN networking environment, the computer 710 may include a modem 785 or other means for establishing communications over the WAN 783, such as the Internet. The modem 785, which may be internal or external, may be connected to the system bus 730 via the user input interface 765 or other appropriate mechanism. A wireless networking component including an interface and antenna may be coupled through a device, such as an access point or peer computer to a LAN 782 or WAN 783. In a networked environment, program modules depicted relative to the computer 710, or portions thereof, may be stored in the remote memory storage device. By way of example, and not limitation, FIG. 7 illustrates remote application programs 786 as residing on memory storage device 781. It may be appreciated that the network connections shown are examples and other means of establishing a communications link between the computers may be used.

The block diagram of FIG. 7 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 7 may be performed by other elements in FIG. 7, or an entity (e.g., processor, web service, server, applications, computing device, etc.) not shown in FIG. 7.

Figure 8:
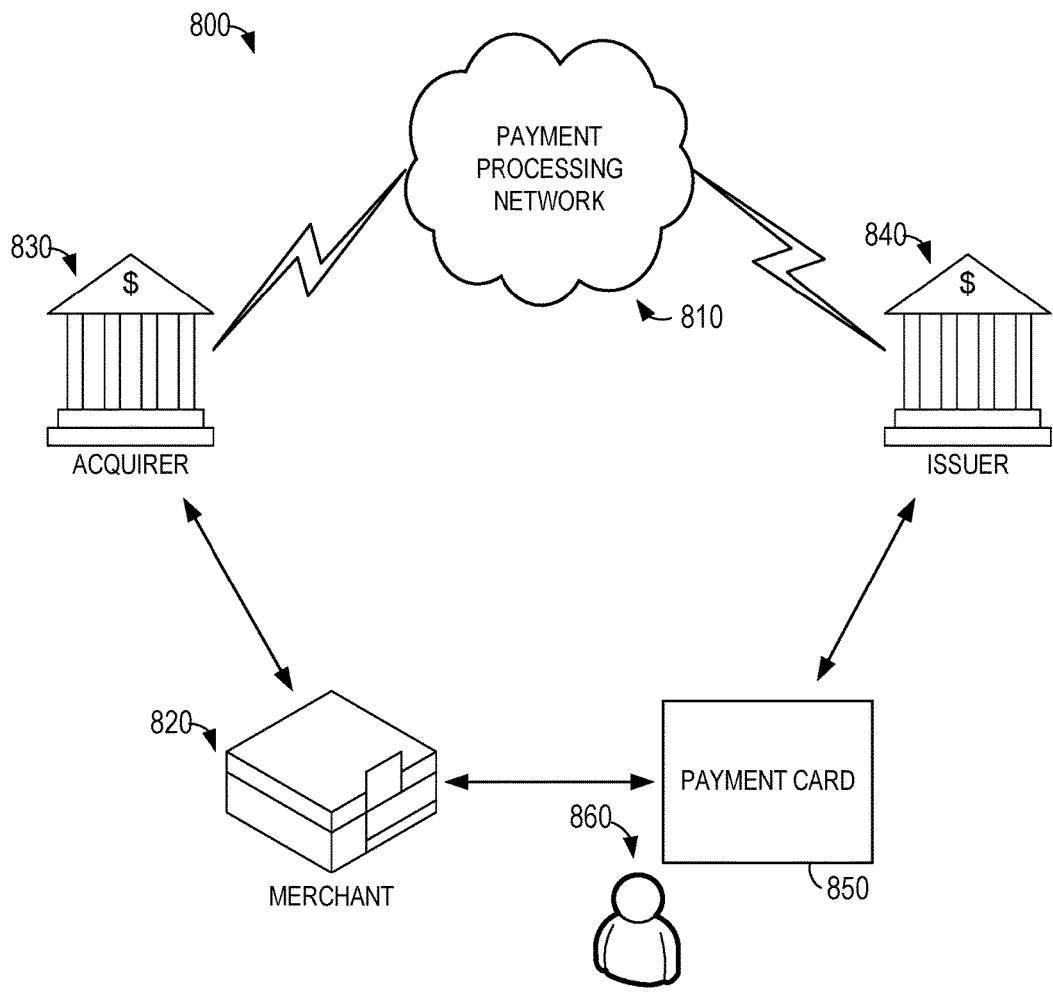
FIG. 8 is a block diagram illustrating an example environment for processing one or more financial transactions.

FIG. 8 is a block diagram illustrating an example environment 800 for processing one or more financial transactions. The system server 110 (shown in FIG. 1), for example, may process one or more financial transactions in the environment 800. The environment 800 includes a processing network 810, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 800 includes one or more merchants 820 that accept payment via the processing network 810. For example, payment may be accepted at the client device 120. To accept payment via the processing network 810, the merchant 820 establishes a financial account with an acquirer 830 that is a member of the processing network 810. The acquirer 830 is a financial institution that maintains a relationship with one or more merchants 820 to enable the merchants 820 to accept payment via the processing network 810. The acquirer 830 may also be known as an acquiring bank, a processing bank, or a merchant bank.

The environment 800 includes one or more issuers 840 that issue or provide payment cards 850 (e.g., credit card, debit card, prepaid card, and the like) or other payment products to one or more cardholders 860 (e.g., cardholder 122) or, more broadly, account holders ("cardholder" and "account holder" may be used interchangeably herein). The issuer 840 is a financial institution that maintains a relationship with one or more cardholders 860 to enable the cardholders 860 to make a payment using the payment card 850 via the processing network 810.

A cardholder 860 (e.g., cardholder 122) uses a payment product, such as a payment card 850, to purchase a good or service from a merchant 820. In some embodiments, the payment card 850 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 850 to purchase a good or service from a merchant 820. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 860 may use any payment product that is linked or associated with a corresponding financial account maintained by an issuer 840. As described herein, the term "payment card" includes credit cards, debit cards, prepaid cards, digital cards, smart cards, and any other payment product that is linked or associated with a corresponding financial account maintained by an issuer 840. Payment cards 850 may have any shape, size, or configuration that enables the environment 800 to function as described herein.

A cardholder 860 may present the merchant 820 with a payment card 850 to make a payment to the merchant 820 in exchange for a good or service. Alternatively, the cardholder 860 may provide the merchant 820 with account information associated with the payment card 850 without physically presenting the payment card 850 (e.g., for remote financial transactions including e-commerce transactions, card-not-present transactions, or card-on-file transactions). Account information may include a name of the cardholder 860, an account number, an expiration date, and/or a security code (such as a card verification value (CVV), a card verification code (CVC), and the like).

The merchant 820 requests authorization from an acquirer 830 for at least the amount of the purchase. The merchant 820 may request authorization using any financial transaction computing device configured to transmit account information of the cardholder 860 to one or more financial transaction processing computing devices of the acquirer 830. For example, the merchant 820 may request authorization through a point-of-sale (POS) terminal, which reads account information of the cardholder 860 from a microchip or magnetic stripe on the payment card 850, and transmits the cardholder's account information to the one or more financial transaction processing computing devices of the acquirer 830. For another example, the POS terminal reads account information of the cardholder 860 from a device configured to communicate with the POS terminal using contactless payment technology, and transmits the cardholder's account information to one or more financial transaction processing computing devices of the acquirer 830.

Using the processing network 810, the financial transaction processing computing devices of the acquirer 830 communicate with one or more financial transaction processing computing devices of an issuer 840 to determine whether the account information of the cardholder 860 matches or corresponds to the account information of the issuer 840, whether the account is in good standing, and/or whether the purchase is covered by (e.g., less than) a credit line or account balance associated with the financial account. Based on these determinations, the financial transaction processing computing devices of the issuer 840 determine whether to approve or decline the request for authorization from the merchant 820.

If the request for authorization is declined, the merchant 820 is notified as such, and may request authorization from the acquirer 830 for a lesser amount or request an alternative form of payment from the cardholder 860. If the request for authorization is approved, an authorization code is issued to the merchant 820, and the cardholder's available credit line or account balance is decreased. The financial transaction is then settled between the merchant 820, the acquirer 830, the issuer 840, and/or the cardholder 860. Settlement typically includes the acquirer 830 reimbursing the merchant 820 for selling the good or service, and the issuer 840 reimbursing the acquirer 830 for reimbursing the merchant 820. When a credit card is used, the issuer 840 may bill the cardholder 860 to settle a financial account associated with the cardholder 860. When a debit or prepaid card is used, the issuer 840 may automatically withdraw funds from the account.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for processing one or more financial transactions. For example, the elements illustrated in FIGS. 1, 2, and 6-8, such as when encoded to perform the operations illustrated in FIGS. 3-6, constitute at least an example means for receiving a request for authorization for a present financial transaction (e.g., interface component 210); an example means for identifying a reference delivery receipt associated with a prior financial transaction (e.g., extraction component 220); an example means for generating a confidence metric associated with the prior financial transaction (e.g., metric component 230); and/or an example means for generating a transaction score for the present financial transaction (e.g., score component 240).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computing device for processing one or more financial transactions, the computing device comprising:
   a memory device storing data associated with one or more cardholder accounts, one or more delivery receipts associated with the one or more cardholder accounts, and computer-executable instructions; and
   a processor configured to execute the computer-executable instructions to:
      receive a request for authorization for a present financial transaction, the present financial transaction associated with a cardholder account of the one or more cardholder accounts;

based on the cardholder account, identify a plurality of the one or more delivery receipts associated with the cardholder account;

based on the identified plurality of delivery receipts, identify a reference delivery receipt corresponding to a prior financial transaction associated with the cardholder account;

analyze the identified reference delivery receipt to generate a confidence metric associated with the prior financial transaction compare the generated confidence metric with a threshold to determine whether the confidence metric satisfies the threshold;

on condition that the confidence metric satisfies the threshold, generate a transaction score for the present financial transaction based on the confidence metric, the generated transaction score indicative of an expected risk associated with approving the request for authorization; and approve the request for authorization based on the generated transaction score.

2. The computing device of claim 1, wherein the processor is further configured to execute the computer-executable instructions to:

based on the cardholder account, identify a set of delivery receipts corresponding to one or more prior financial transactions associated with the cardholder account, the set of delivery receipts including the reference delivery receipt; and analyze the set of delivery receipts to identify transaction data associated with the one or more prior financial transactions, wherein the reference delivery receipt is identified based on the transaction data.

3. The computing device of claim 1, wherein the processor is further configured to execute the computer-executable instructions to:

analyze the request for authorization to identify a first transaction data associated with the present financial transaction;

based on the cardholder account, identify a set of delivery receipts corresponding to one or more prior financial transactions associated with the cardholder account, the set of delivery receipts including the reference delivery receipt;

analyze the set of delivery receipts to identify a second transaction data associated with the one or more prior financial transactions; and compare the first transaction data with the second transaction data, wherein the reference delivery receipt is identified based on the comparison of the first transaction data with the second transaction data.

4. The computing device of claim 1, wherein the processor is further configured to compare the generated transaction score for the present financial transaction with another threshold and automatically decline the present financial transaction on condition that the generated transaction score does not satisfy the another threshold.

5. The computing device of claim 1, wherein the processor is further configured to execute the computer-executable instructions to automatically approve the present financial transaction based on the generated transaction score without prompting a cardholder of the cardholder account for approval.

6. The computing device of claim 1, wherein the processor is further configured to execute the computer-executable instructions to:

analyze the request for authorization to identify a delivery address associated with the present financial transaction; and based on the delivery address, identify a delivery zone associated with the present financial transaction, wherein the transaction score is generated based on the delivery zone.

7. The computing device of claim 1, wherein the processor is further configured to execute the computer-executable instructions to:

analyze the request for authorization to identify a first delivery address associated with the present financial transaction;

analyze the reference delivery receipt to identify a second delivery address associated with the prior financial transaction; and compare the first delivery address with the second delivery address, wherein the transaction score is generated based on the comparison of the first delivery address with the second delivery address.

8. The computing device of claim 1, wherein the processor is further configured to execute the computer-executable instructions to approve the request for authorization based on the generated transaction score without a payment card associated with the cardholder account being physically presented for approving the request for authorization.

9. The computing device of claim 1, wherein the processor is further configured to execute the computer-executable instructions to:

analyze the reference delivery receipt to identify recipient identifier data associated with the prior financial transaction; and compare the recipient identifier data with user identifier data associated with the cardholder account, wherein the confidence metric is generated based on the comparison of the recipient identifier data with the user identifier data.

10. The computing device of claim 1, wherein the processor is further configured to execute the computer-executable instructions to:

analyze the reference delivery receipt to identify biometric data associated with the prior financial transaction;

communicate with a register device to identify first user identifier data corresponding to the biometric data; and compare the first user identifier data with second user identifier data associated with the cardholder account, wherein the confidence metric is generated based on the comparison of the first user identifier data with the second user identifier data.

11. A computer-implemented method for processing one or more financial transactions, the computer-implemented method comprising:

receiving, from a client device, a request for authorization for a present financial transaction associated with a cardholder account;

based on the cardholder account, identifying a reference delivery receipt associated with a prior financial transaction associated with the cardholder account;

analyzing the identified reference delivery receipt to generate a confidence metric associated with the prior financial transaction;

comparing the generated confidence metric with a threshold to determine whether the confidence metric satisfies the threshold;

on condition that the confidence metric satisfies the threshold, generating a transaction score associated with the present financial transaction based on the confidence metric, the generated transaction score indicative of an expected risk associated with approving the request for authorization; and approving the request for authorization based on the generated transaction score.

12. The computer-implemented method of claim 11, wherein identifying the reference delivery receipt comprises:

analyzing the request for authorization to identify a first transaction data associated with the present financial transaction;

based on the cardholder account, identifying a plurality of delivery receipts associated with a plurality of prior financial transactions;

analyzing a first delivery receipt of the plurality of delivery receipts to identify a second transaction data associated with a prior financial transaction of the plurality of prior financial transactions;

comparing the first transaction data with the second transaction data to generate a similarity metric indicative of a similarity between the present financial transaction and the prior financial transaction; and based on the first transaction data and the similarity metric, determining whether to identify the first delivery receipt as the reference delivery receipt.

13. The computer-implemented method of claim 11, wherein the generated transaction score for the present financial transaction is compared with another threshold and the present financial transaction is automatically declined on condition that the generated transaction score does not satisfy the another threshold.

14. The computer-implemented method of claim 11, wherein generating the confidence metric comprises:

analyzing the reference delivery receipt to identify a delivery address associated with the prior financial transaction; and based on the delivery address, identifying a delivery zone associated with the prior financial transaction, wherein the confidence metric is generated based on the delivery zone.

15. The computer-implemented method of claim 11, wherein the present financial transaction is automatically approved based on the generated transaction score without prompting a cardholder of the cardholder account for approval.

16. The computer-implemented method of claim 11, wherein generating the confidence metric comprises:

analyzing the reference delivery receipt to identify recipient identifier data associated with the prior financial transaction; and comparing the recipient identifier data with user identifier data associated with the cardholder account, wherein the confidence metric is generated based on the comparison of the recipient data with the user identifier data.

17. The computer-implemented method of claim 11, wherein generating the confidence metric comprises:

analyzing the reference delivery receipt to identify biometric data associated with the prior financial transaction;

transmitting, to a register device, a request for information including the biometric data;

receiving, from the register device, a response to the request for information including first user identifier data associated with the biometric data; and comparing the first user identifier data with a second user identifier data associated with the cardholder account, wherein the confidence metric is generated based on the comparison of the first user identifier data with the second user identifier data.

18. The computer-implemented method of claim 11, wherein generating the transaction score comprises:

analyzing the request for authorization to identify a first delivery address associated with the financial transaction;

based on the delivery address, identifying a delivery zone associated with the present financial transaction, wherein the transaction score is generated based on the delivery zone;

analyzing the reference delivery receipt to identify a second delivery address associated with the prior financial transaction; and comparing the first delivery address with the second delivery address to generate a similarity metric indicative of a similarity between the present financial transaction and the prior financial transaction, wherein the transaction score is generated based on the delivery zone and the similarity metric.

19. A computer-readable storage device having computer-executable instructions embodied thereon, the computer-readable storage device comprising:

an interface component that, upon execution by at least one processor, causes a computing device to receive a request for authorization for a present financial transaction associated with a cardholder account;

an extraction component that, upon execution by the at least one processor, causes the computing device to identify a reference delivery receipt associated with a prior financial transaction associated with the cardholder account;

a metric component that, upon execution by the at least one processor, causes the computing device to analyze the identified reference delivery receipt to generate a confidence metric associated with the prior financial transaction;

a score component that, upon execution by the at least one processor, causes the computing device to compare the generated confidence metric with a threshold to determine whether the confidence metric satisfies the threshold, and on condition that the confidence metric satisfies the threshold, generate a transaction score for the present financial transaction based on the confidence metric, the generated transaction score indicative of an expected risk associated with approving the request for authorization; and a transaction component that, upon execution by the at least one processor, causes the computing device to approve the request for authorization based on the generated transaction score.

20. The computer-readable storage device of claim 19, wherein the metric component is further configured to cause the computing device to identify a delivery zone of a first delivery address associated with the present financial transaction, identify a second delivery address associated with the prior financial transaction, and compare the first delivery address with the second delivery address to generate a similarity metric indicative of a similarity between the present financial transaction and the prior financial transaction, the score component is further configured to cause the computing device to generate the transaction score based on the identified delivery zone and the similarity metric, and the computer-readable storage device further comprises a transaction component configured to determine whether the transaction score satisfies another threshold and, on condition that the another threshold is satisfied, approve a request for reconsideration.

* * * * *